(12) United States Patent
Kalil

(10) Patent No.: US 10,858,070 B2
(45) Date of Patent: *Dec. 8, 2020

(54) MULTI HULL PONTOON BOAT AFT COCKPIT EXTENSION

(71) Applicant: Anthony Kalil, Palm City, FL (US)

(72) Inventor: Anthony Kalil, Palm City, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/577,812

(22) Filed: Sep. 20, 2019

(65) Prior Publication Data

US 2020/0198733 A1    Jun. 25, 2020

Related U.S. Application Data

(60) Provisional application No. 62/860,447, filed on Jun. 12, 2019, provisional application No. 62/791,488, filed on Jan. 11, 2019, provisional application No. 62/734,689, filed on Sep. 21, 2018.

(51) Int. Cl.
| | | |
|---|---|---|
| *B63B 3/46* | (2006.01) | |
| *B63B 1/08* | (2006.01) | |
| *B63B 3/56* | (2006.01) | |
| *B63B 1/12* | (2006.01) | |
| *B63B 3/14* | (2006.01) | |

(52) U.S. Cl.
CPC ............... *B63B 3/46* (2013.01); *B63B 1/08* (2013.01); *B63B 1/125* (2013.01); *B63B 3/14* (2013.01); *B63B 3/56* (2013.01)

(58) Field of Classification Search
CPC .... B63B 3/46; B63B 3/14; B63B 3/56; B63B 1/10; B63B 1/08; B63B 1/125; B63B 83/00

See application file for complete search history.

(56) References Cited

U.S. PATENT DOCUMENTS

| | | | | |
|---|---|---|---|---|
| 148,957 | A * | 3/1874 | Jackson | B63B 1/08 114/57 |
| 3,726,245 | A * | 4/1973 | Critcher | B63B 13/00 114/61.1 |
| 9,394,032 | B1 * | 7/2016 | Pigeon | B63B 1/08 |
| 10,124,859 | B2 * | 11/2018 | Burnett | B63H 20/02 |
| 2009/0227157 | A1 * | 9/2009 | Mochizuki | B63H 20/02 440/53 |
| 2011/0232557 | A1 * | 9/2011 | Kilgore | B63B 1/08 114/271 |
| 2018/0312230 | A1 * | 11/2018 | Zolotuhin | B63B 59/02 |
| 2020/0130786 | A1 * | 4/2020 | Ekern | B63B 29/04 |

* cited by examiner

*Primary Examiner* — Stephen P Avila
(74) *Attorney, Agent, or Firm* — Saliwanchik, Lloyd & Eisenschenk

(57) ABSTRACT

A cockpit extension extends aft between port and starboard outboard engines mounted on a tri-pontoon boat transom for increasing the usable afterdeck area of the boat. The cockpit extension includes a topside deck that can be accessed from the afterdeck of the boat and an under-face beneath the topside deck that can be above or below the water-line of the boat. A lower surface of the under-face can be configured to improve the backing down characteristics of the boat.

7 Claims, 13 Drawing Sheets

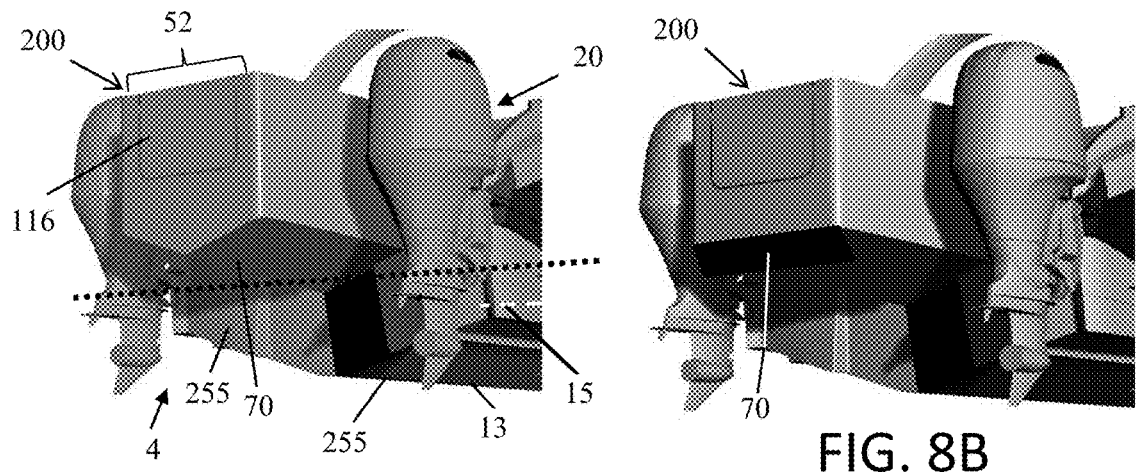
FIG. 8A
FIG. 8B
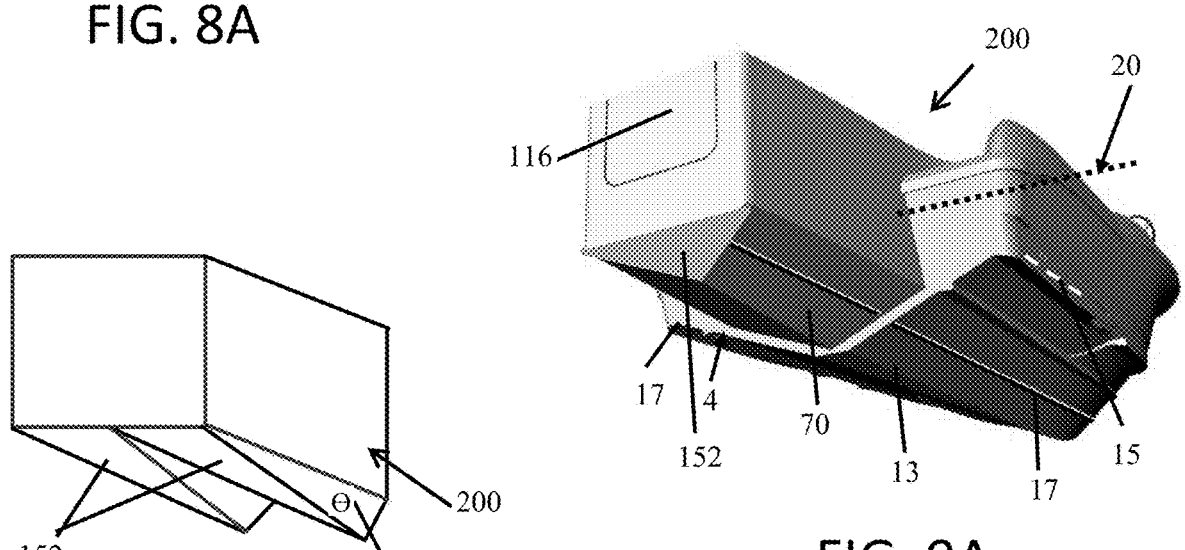
FIG. 11
FIG. 9A
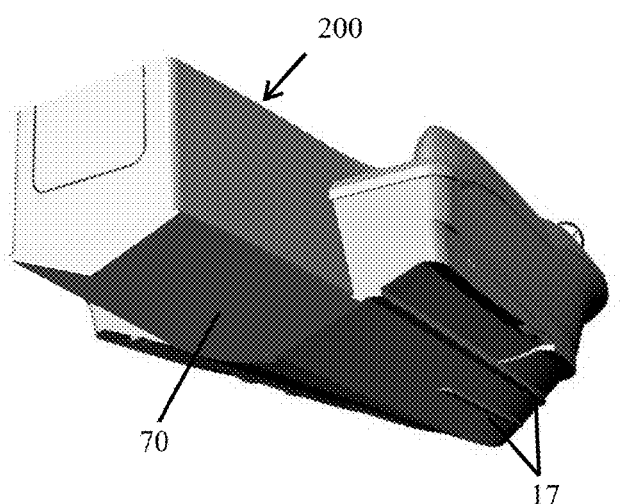
FIG. 9B

MULTI HULL PONTOON BOAT AFT COCKPIT EXTENSION

CROSS-REFERENCE TO RELATED APPLICATIONS

This application claims the benefit of U.S. Provisional Application Nos. 62/734,689, filed Sep. 21, 2018; 62/791,488, filed Jan. 11, 2019; and 62/860,447, filed Jun. 12, 2019; all of which are hereby incorporated by reference in their entirety.

BACKGROUND OF INVENTION

Historically, outboard powered aluminum pontoon boats have been a popular segment of the boating industry, particularly for smaller single-engine multi hull boats, from 14 to 20 feet in length. They offer features such as simplicity, weight savings over other types of powered boats, and the added stability that multi-hull boats offer. Leisure pontoon boats have grown significantly in size. Technologies have been developed that have also dramatically increased the horsepower available in outboard engines, and the increased buoyancy of the new and larger displacement triple hulls has enabled pontoon boats to support greater weight capacities. Leisure pontoon boats are now commonly sold with three pontoons, with widths over 10 feet, and lengths from 30 to 45 feet. The triple hulled pontoon boats are widely known as Tri-Toons.

Pontoon boats are popular for the widely spaced hull locations that allow many competitive advantages in stability, which provide a stable and safe platform. When weight is placed at the sides of a multi hull boat, they exhibit less roll, or listing, as the floatation is typically greater at the edges of the boat. Conversely, V hull boat designs have most of their buoyancy at the center of the hull, where the bottom of the V displaces the most water. This location of the buoyancy point, far underneath the hull, gives V hull designs a "tenderness", or propensity to rock from side to side, and to list, or lean down when weight is placed near the side. Pontoon boats are often boarded from the sides, or at the aft platform corners, since the weight of boarding passengers tends not to significantly affect the hull buoyancy.

Additionally, pontoon boats often feature fully enclosed cockpits, often made out of aluminum or fiberglass panels. These full cockpit enclosures can also define the gunwales of the boat, and offer benefits over pipe or tube rail enclosures, as they fully enclose the cockpit, and prevent small children or personal items from falling "between the bars," or accidentally exiting the cockpit of the boat. Often, even the boarding gates and doors are fully sheeted in aluminum, or comprise full fiberglass surfaces to fully secure occupants, children, and gear, while allowing ingress/egress to the cockpit. The full enclosure design of leisure pontoon boat vessels gives the occupants a very secure feeling, as the sides of the cockpit are very high, and they fully enclose and define the cockpit to occupants. These safety and security features have contributed greatly to the overall market growth of pontoon boats.

Traditionally, smaller multi-hull leisure pontoon boats have had a single outboard engine located in the center of the boat at the stern that has been mounted on either a center engine mount body, or a full-length third center hull. The designs feature boarding ladders or swim platforms arranged or extended to the sides of the engine, at the aft corners of the boat. These platforms often extend past the engine so that occupants can still access the dock from the stern of the boat.

With the industry trend to build larger triple pontoon boats, the need for twin engine applications is increasing. Boat builders are now exploring and building triple hull leisure pontoon boats that feature two or more outboard engines mounted at the corners of the boat.

While the traditional multi-engine outboard powered Tri-Toon boat design has many advantages over a single center-mounted outboard engine design, it also has several disadvantages. For example, while the twin outboard engines mounted at the extreme edges of the boat provide additional performance and power redundancy, they negatively affect the usable afterdeck space at the stern of the boat in many ways. The mounting of the engines at the corners of the boat helps keep the engines' propellers in the correct relation to the hulls' running surfaces (since the hulls are located at the extreme edges of the boat), with the majority of the gear case shrouded by the transom of the hull. This placement of the engines can limit the amount of usable cockpit and boarding deck area at the aft corners of the boat.

In situations where a boat is moored, the only access to board the boat from the stern may now be across the stern or straight from the rear, however, the outboard engines keep the aft cockpit too far away from the dock to safely access the boat from the rear.

It is clear that the usable cockpit space previously available at the stern of a multi-hull outboard powered pontoon boat is partially or completely blocked by use of widely spaced twin outboard engines. While the application of the twin outboard engines has contributed to the design of large pontoon boats, it has compromised the design as well.

Outboard engines are usually vulnerable to damage from the rear, as they are exposed at the aft end of the hull. The engines are vulnerable to striking docks, other vessels, and seawalls from docking accidents, drifting, or mooring mishaps due to tide changes. Some hull designs offer small extensions to the sides of the hull that may offer minimal protection from bumping the engines at the sides, however, any protection from a direct rear impact or contact is inadequate. Additionally, trimming the engines up can expose the propellers and other portions of the engine, and extends them even further aft, which creates both a hazard to occupants of other vessels, and a damage to the up-trimmed engines when contacting a dock or piling from the rear.

In summary, the afterdeck cockpit space of outboard engine powered pontoon boats is compromised because of the position of the outboard engines. Designs that provide more usable cockpit area without adversely affecting the use or performance of the outboard engines are desirable.

BACKGROUND ART

There are several designs of pontoon boats that offer limited access to the stern of the boat through spacing designed between the engines. In all cases, a floor extension or platform is extended between the engines.

One type of deck design for twin outboard powered pontoons has a straight or single curve deck surface without notches for splashwells.

Another design (PREMIER, FIG. 17) provides a flat aft deck surface, with the splashwells and pontoon aft edges extending past the aft deck surface. The center pontoon terminates at an angle, and has steps formed into its aft surface. This design terminates the usable cockpit well forward of the aft deck aft edge.

There are also designs (HARRIS, FIG. 18) with a non-notched aft deck surface, however, the deck shape has a slight curve with the longest point in the center as seen from above. Again, this design terminates the usable cockpit forward of the aft edge of the deck surface, and allows the outside pontoons with their integral splashwells to extend past the deck surface.

Still other designs employ a notched deck surface to allow the center deck to extend appreciably to the extended integral engine mount on the outside pontoons. While these designs do provide advantages, they do not adequately utilize the space between the engines for cockpit space.

A design that does provide some utilization of the area between the engines utilizes a flat aft transom plane that is notched to receive the splashwell cutouts. This design (BENINGTON Q30, FIG. 19) does not have the center platform extending appreciably past the transom plane of the boat and does not allow the occupants to safely ride aft of the engines, nor utilize the platform while underway, since the cockpit still stops in front of the engines. U.S. Coast Guard regulations require that occupants are only allowed to ride in boats where there is a dedicated safe area to ride, with adequate hand holds and protection from being ejected from the boat.

One design (SYLVAN, FIG. 20) mounts twin outboard engines on a pontoon boat with the engines at the extreme corners and the aft deck notched forward to accept the splashwells. In this design, the aft deck notches create a deck surface that, again, extends approximately to the engine mounting plane. A ladder can be positioned to allow boarding between the engines; however, the cockpit stops well forward of the aft-most deck of the boat, which greatly decreases the amount of usable cockpit space.

Still another design (SOUTH BAY, FIG. 21) has a center deck surface that extends a few inches past the engine mounting plane. Like the other similar designs, a ladder can be mounted on the aft deck, and the cockpit is terminated significantly forward of the aft platform, reducing the amount of available cockpit space in the boat.

MANITOU (FIG. 22) teaches a similar notched aft deck, however, the center aft edge of the deck surface does not extend to the plane of the engine mounts.

The subject invention differs from these previous design by providing the cockpit sides, gunwales, and/or an aft transom door that extends past the engine transom plane to extend the usable aft cockpit. This can allow occupants to safely ride aft of the transom plane, or outboard engine mounting plane, thereby increasing the usable cockpit space that is still safely inside the cockpit, including at points even with or aft of the outboard engines.

BRIEF SUMMARY

The subject invention successfully addresses the above described disadvantages associated with the use of two transom-mounted outboard engines on aluminum pontoon boats and provides improvements and advantages that heretofore have not been available on such boats. The subject invention specifically provides improvements to tri-pontoon boats, wherein the hull comprises a center pontoon at the boat midline and outside pontoons along both the port and starboard sides, respectively, of the boat. In particular, the subject invention provides novel and highly effective methods and devices for increasing the afterdeck cockpit area of a boat without adversely affecting the operation of the outboard engines.

In accordance with the invention, additional afterdeck area on a boat is provided by a cockpit extension. The typical space between the widely spaced outboard engines is extended at floor level, and the side gunwales, fencing, and/or cockpit sides, can be extended past the engine mounting plane, so that a full cockpit extension can be provided in the area between the separated engines.

The deck of the cockpit extension can be continuous with the afterdeck of the boat at the forward end and the aft end can extend any distance from the plane of the transom, including aft of the engines. Thus, the cockpit extension is accessible from at least the afterdeck area. The freeboard and gunwales or other form of cockpit sides such as fencing or railing systems of the boat can be extended to the cockpit extension to provide cockpit sides that partially or fully enclose the deck of the cockpit extension. A cockpit extension can also afford an alternative location for boarding a boat and can include an entry, such as an aft boarding door or open walkway bordered by cockpit sides.

The under-face of the cockpit extension can be configured at any height on the plane of the transom, relative to the water line. Thus, the under-face of the cockpit extension can be above, below, or level with the water line. Furthermore, with regard to pontoon boats, the center pontoon boat hull can be incorporated with the under-face of the cockpit extension to form a continuous hull with the cockpit extension. Alternatively, the cockpit extension can be on a different plane than the pontoon boat hull. Advantageously, the under-face of a boat can be configured with a lower surface that can raise the rear of the hull during backdown of the boat and inhibit "digging in" of the stern.

This Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions. The invention is defined by the claims below.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 8A illustrates the stern of a V-hulled boat with an embodiment of a cockpit extension with an under-face above the water line of the boat. In this embodiment, the under-face of the cockpit extension has a V-shape.

FIG. 8B illustrates the stern of a V-hulled boat with an embodiment of a cockpit extension with an under-face above the water line of the boat. In this embodiment, the under-face of the cockpit extension is flat or perpendicular to the transom.

FIG. 9A illustrates the stern of a boat with an embodiment of a cockpit extension having an under-face that is slightly stepped to the lower hull of the boat. Also shown is an alternative reverse incline surface on the cockpit extension.

FIG. 9B illustrates the stern of a boat with an embodiment of a cockpit extension having an under-face that is coplanar and continuous with the hull of the boat.

FIG. 11 illustrates an embodiment of a cockpit extension with a lower surface having more than one reverse incline plane.

DETAILED DISCLOSURE

Figure 1:
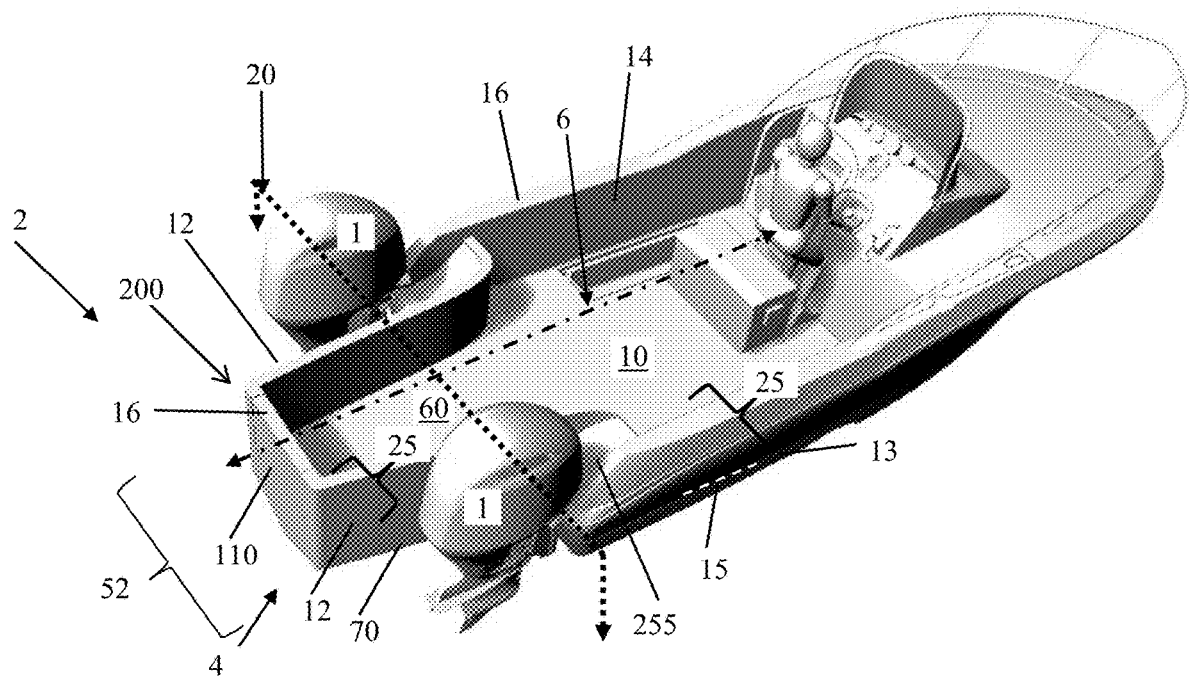
FIG. 1 is an illustration of the stern end of a boat with a cockpit extension, according to an embodiment of the subject invention.

The subject invention pertains to an improvement to boats powered by two outboard engines mounted on the outer pontoon hulls. More specifically, the subject invention provides embodiments of a cockpit extension that provide additional area to the afterdeck around the outboard engines without adversely affecting the operation of the engines or the boat. Embodiments of the subject invention can be used with both V-hull boats and pontoon boats.

The following description will disclose that the subject invention is particularly useful for boats having two transom-mounted outboard engines. A person with skill in the art, however, will recognize numerous other uses that would be applicable to the devices and methods of the subject invention. Thus, while the subject application describes, and many of the terms herein relate to, V-hull and pontoon boats having two widely spaced transoms and outboard engines secured thereto, other modifications apparent to a person with skill in the art and having benefit of the subject disclosure are contemplated to be within the scope of the present invention.

In the description that follows, a number of terms relating to both V-hull and pontoon boats are utilized. Many of the terms are standard in the art, but others relate specifically to the subject invention. In order to provide a clear and consistent understanding of the specification and claims, including the scope to be given such terms, the following definitions are provided.

As used herein, unless otherwise indicated, the term "boat" is a general reference to both V-hull and pontoon boats, particularly tri-pontoon boats. The Figures of the application show some embodiments described herein on a V-hull boat and others are shown on a pontoon boat. It should be understood that all permutations of a cockpit extension of the subject invention can be utilized with V-hull boats and pontoon boats, including tri-pontoon boats.

As used herein, "afterdeck" refers to the area of the boat deck at the aft end of the boat, aft of the controls console and forward of the transom.

As used herein, "cockpit" refers to that area of the afterdeck enclosed or defined by any of raised inner bulkhead and/or gunwales and/or aft-most seats. On some pontoon boats railings may take the place of bulkhead or gunwales in enclosing the cockpit.

Also as used herein "transom plane" refers to a plane that includes a transom configured for attachment of an outboard engine and is perpendicular to the boat midship.

In addition, as used herein, "open transom" refers to an area on the boat transom that is not occupied by an outboard engine. More specifically, the phrase refers to an area between or to the port and/or starboard side of the outboard engines mounted on the boat transom. The transom area can have or can be made to have an opening to facilitate movement between the afterdeck and the deck extension.

The term "top side," as used herein refers to anything on the boat that is on or above the deck of the boat or the deck of the cockpit extension. Likewise, as used herein, the term "bottom side" refers to anything that is below the deck of the boat or the deck of a cockpit extension.

It should be understood that the use of "and/or" is defined inclusively such that the term "a and/or b" should be read to include the sets: "a and b," "a or b," "a," and "b."

Furthermore, the terms "about" or "approximately," as used herein, are defined as at least close to a given condition, value, or either end of a range as is necessary to cover manufacturing variances, equipment tolerances, and normal variances in material, as understood by those skilled in the art.

It should also be understood that, as used herein, and unless otherwise specifically stated, the terms "operable communication," "operable connection," "operably connected," "cooperatively engaged," and grammatical variations thereof mean that the particular elements are connected in such a way that they cooperate to achieve their intended function or functions. The "connection" or "engagement" may be direct or indirect, physical or remote.

The figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

The present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

Reference will be made to the attached Figures on which the same reference numerals are used throughout to indicate the same or similar components. With reference to the attached Figures, which show certain embodiments of the subject invention, it can be seen in FIGS. 1-5 that a cockpit extension 200 of the subject invention utilized on a boat comprises a deck 60 on the topside 2 and an under-face 70 beneath the deck 60, which can have a lower surface 8, on the bottom side 4. Other embodiments can include an inside bulkhead 14, an outer freeboard 12, a gunwale 16 and, optionally, an entryway 110 on the cockpit extension. Optionally, on a pontoon boat these can be partially or completely replaced by a railing system 95. Each of these and other components will be discussed in detail below.

Initially, there are two methods by which a cockpit extension 200 can be operably connected to a boat. The first is to manufacture the boat and cockpit extension together, so they are integrated and form a monolithic structure. With this method, the cockpit extension can be incorporated into the boat mold(s) and is manufactured simultaneously with and molded or formed to be integral with the other boat components. The other method is for the cockpit extension to be an "add-on" or "bolt-on" component to an existing boat. With this method, the cockpit extension can be a fully or partially complete structure configured for operable connection to an existing boat. This method can also require that the existing boat be at least partially modified to receive the forward end of a cockpit extension on an open transom area formed in the boat transom, so that the aft end of the cockpit extension is directed out from the transom plan. This can include forming an opening in the transom that can facilitate movement between the afterdeck and the deck of the cockpit extension. The embodiments described herein are applicable to any cockpit extension, whether incorporated with or added onto a boat.

Figure 23:
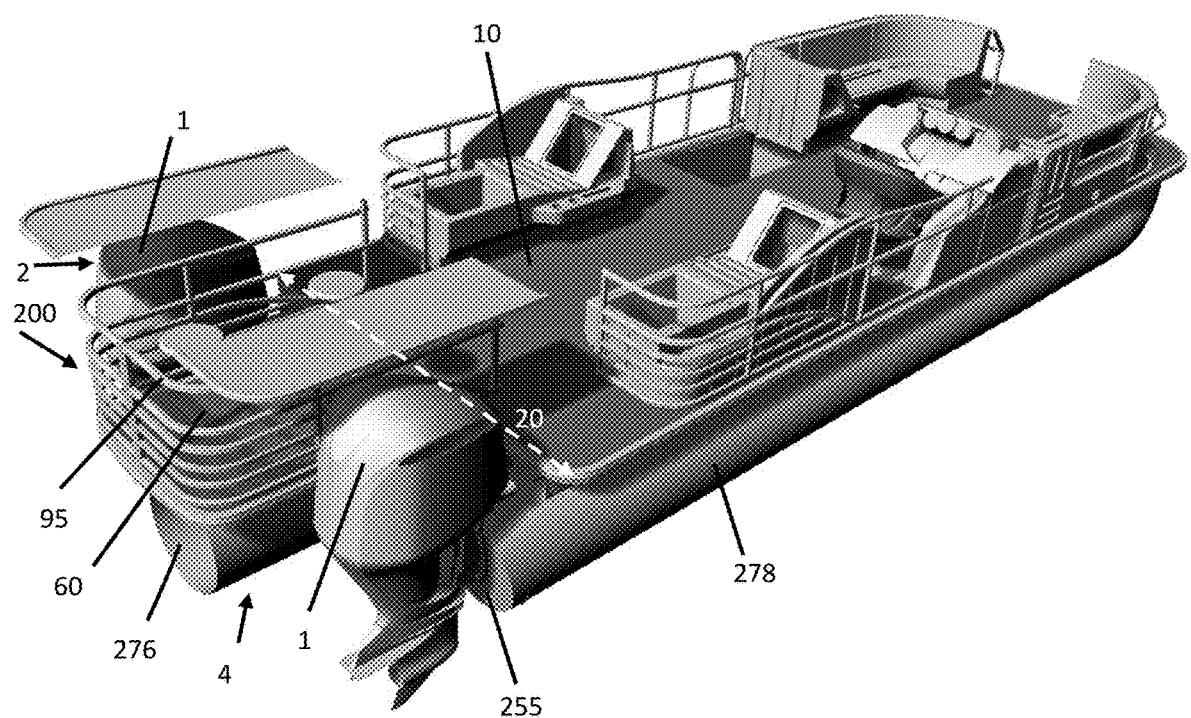
FIG. 23 is illustration of the stern end of a pontoon boat with a cockpit extension, according to an embodiment of the subject invention. It can be seen in this Figure that the forward end of the cockpit extension is operatively connected to the transom along a transom plane and the aft end extends away from the transom plane.
Figure 24:
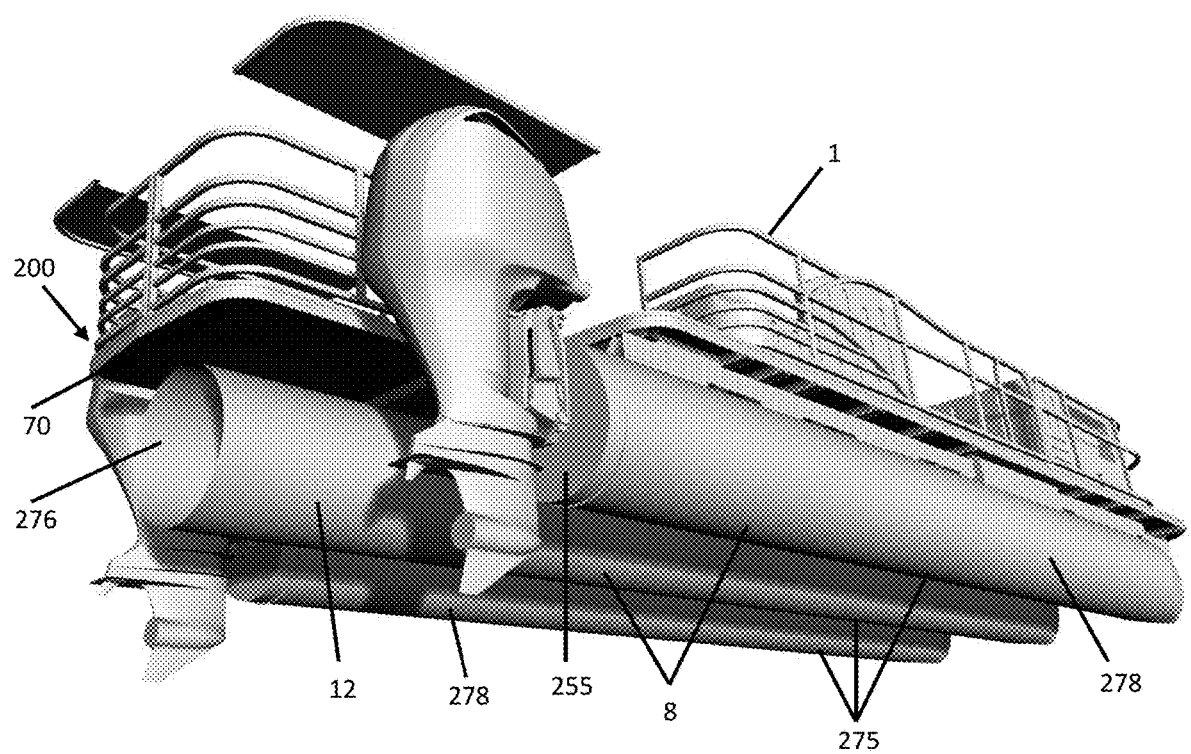
FIG. 24 is an illustration of the stern end of a pontoon boat with a cockpit extension, according to an embodiment of the subject invention. In this embodiment, the under-face of the cockpit extension is in line with the extended center hull of the boat.
Figure 25:
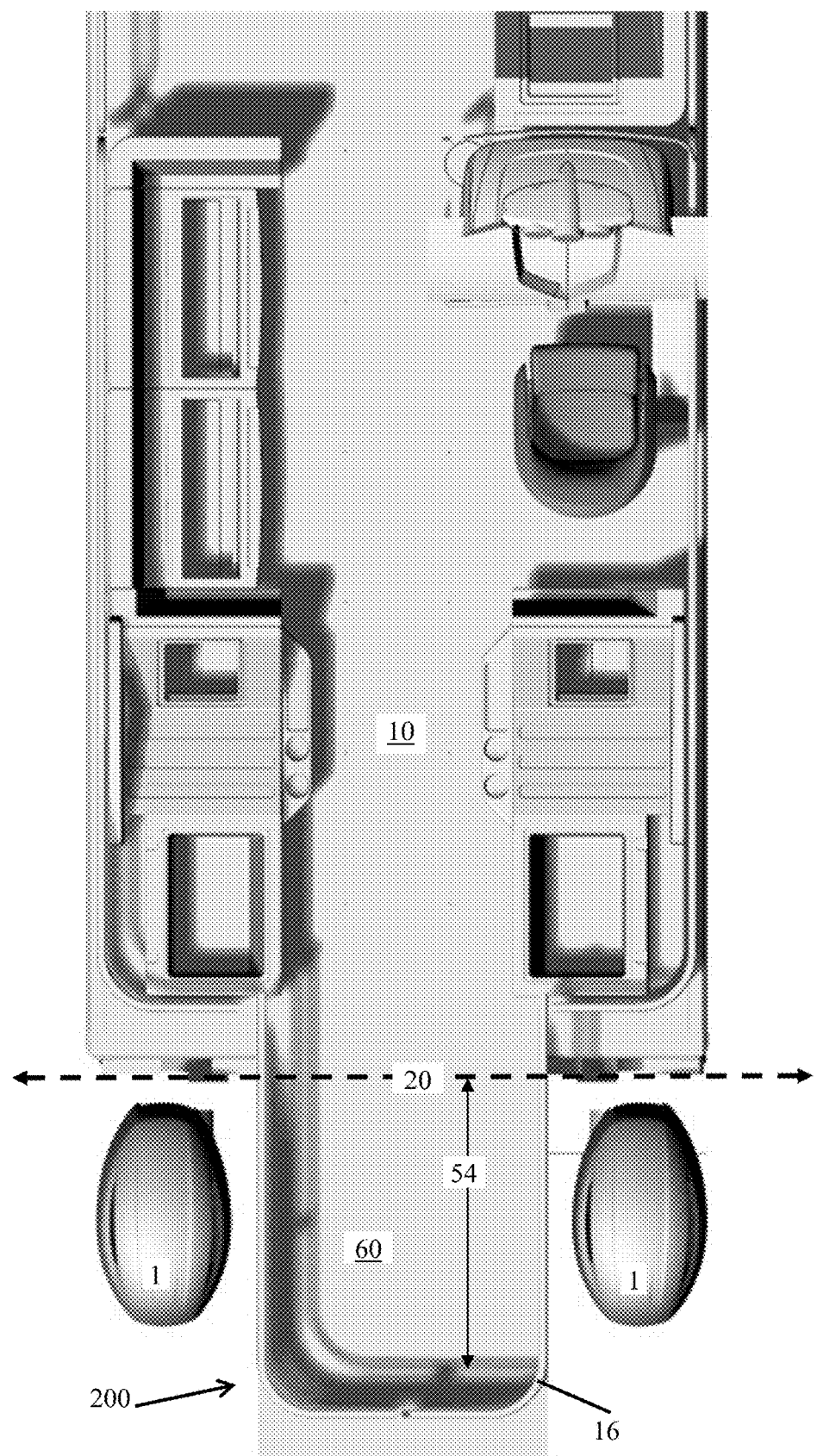
FIG. 25 is a top side plan view of a pontoon boat with a cockpit extension, according to an embodiment of the subject invention. In this embodiment, the boat hull and gunwales extend around to form an enclosed deck extension.
Figure 26:
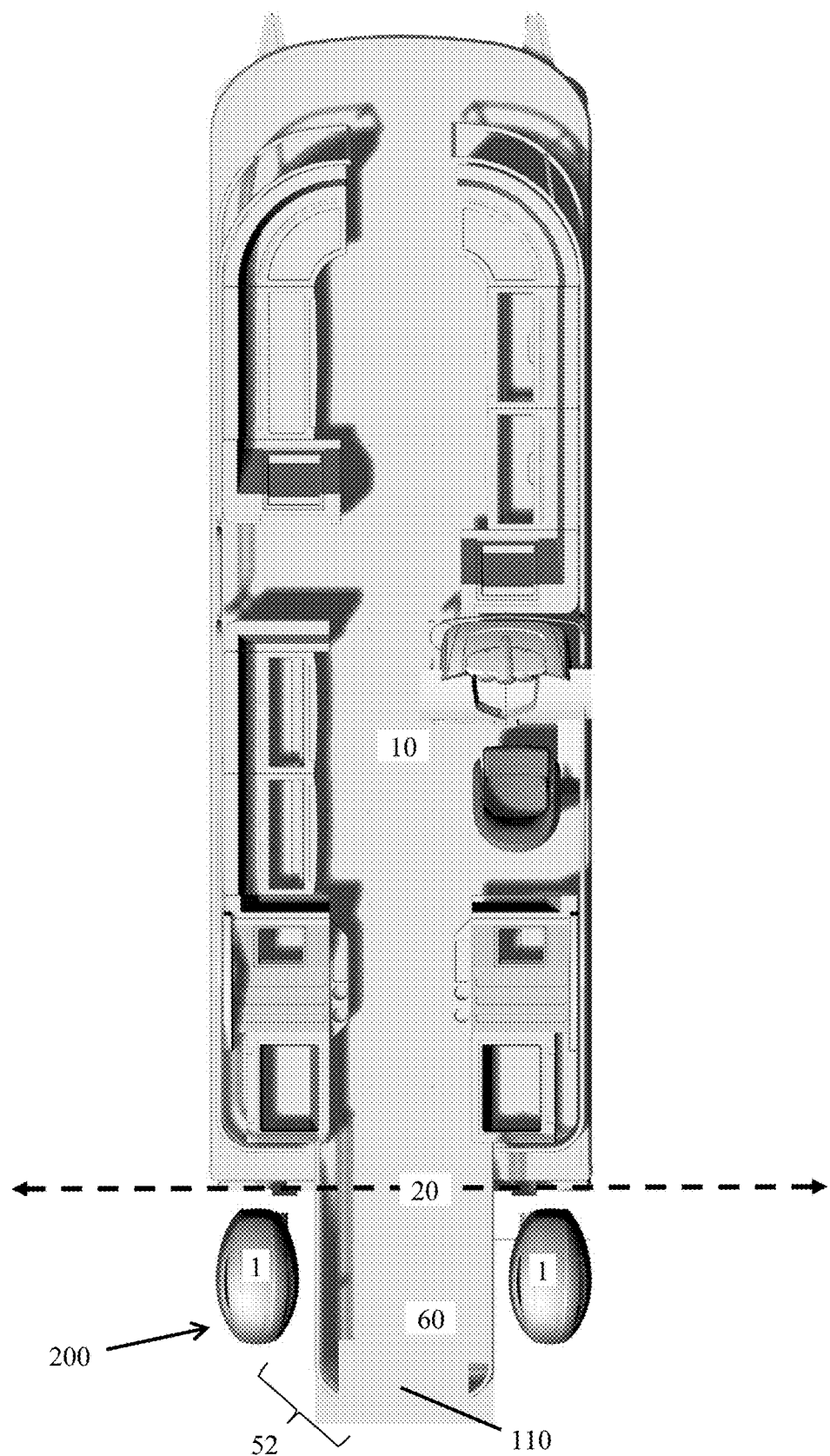
FIG. 26 is a top plan view of a pontoon boat with a cockpit extension, according to an embodiment of the subject invention. In this embodiment, the boat hull and gunwales extend partially around the deck extension, providing a stern entryway. There can also be a door arranged in the entryway to enclose the cockpit extension.

FIGS. 23-25 illustrate embodiments of tri-pontoon boats with an extension 200 formed as a continuation of the floor of the cockpit or afterdeck area. In one embodiment, an example of which is shown in FIG. 24, an extension is supported on a mid-ship, center pontoon 276 that extends past the transom plane 20 of the tri-pontoon boat. As described above, the hull 13 of a tri-pontoon boat is comprised of a center or midship pontoon and two outside pontoons, one to each side of the midship pontoon.

Customarily, the outboard engines 1 on a boat are arranged midship 6 side-by-side on the boat transom 255. This can provide open transom 18 on either side of the engines. FIGS. 9A and 9B illustrate examples of open transom 18. The width (distance from port to starboard) of open transom can depend upon the size and number of outboard engines secured to the boat transom. While the midship arrangement of engines can be convenient for trailering, storage, and boat maneuverability, the engines can be arranged anywhere along the transom plane 20 of the boat transom.

Figure 2:
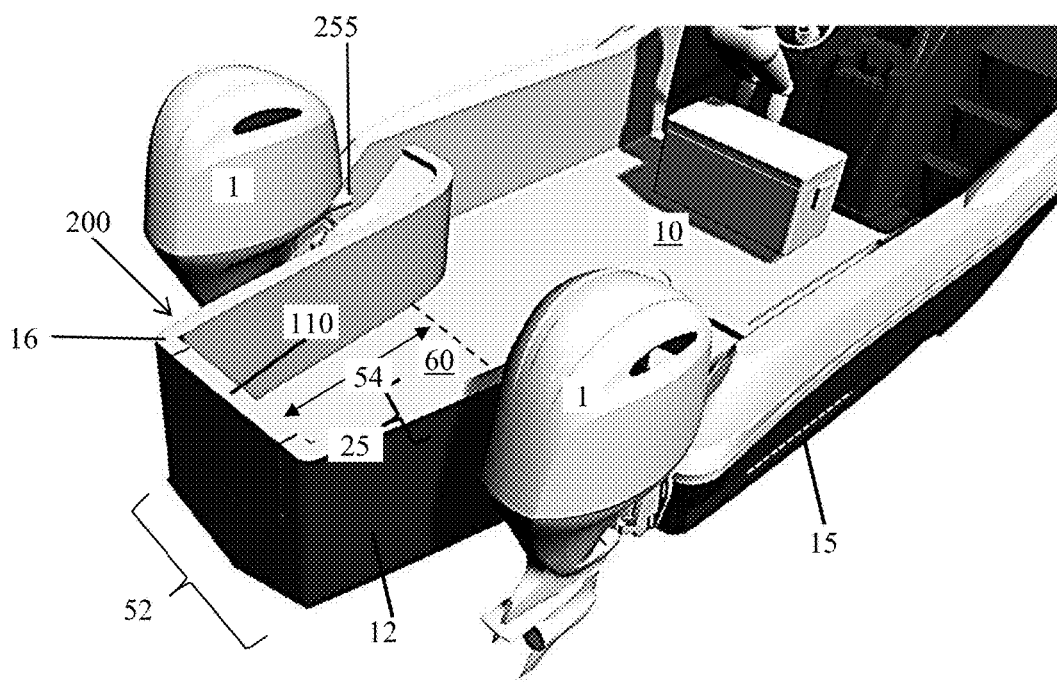
FIG. 2 is an illustration of the stern end of a boat with a cockpit extension, according to an embodiment of the subject invention. In this embodiment, the under-face of the cockpit extension is level with the water line of the boat.
Figure 3:
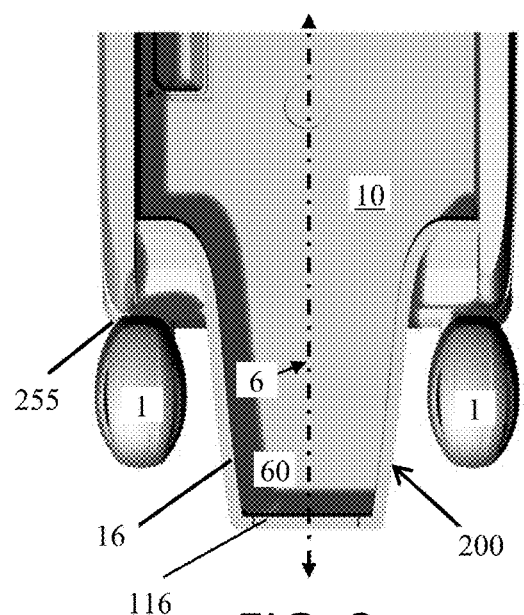
FIG. 3 is a top side plan view of a boat with a cockpit extension, according to an embodiment of the subject invention. In this embodiment, the boat hull and gunwales extend around to form an enclosed deck extension with an aft boarding door, shown in the closed position.

In one embodiment, outboard engines are separated towards the port and starboard sides of the boat, such as shown, for example, in FIGS. 3 and 23. This can provide open transom 18 at the boat midship 6 between the engines. With this arrangement of the engines, a cockpit extension 200 can be positioned in the midship 6 open transom area to extend aft of the boat transom 255. FIGS. 1-7A illustrate non-limiting examples of cockpit extensions arranged midship, between engines separated to the port and starboard sides mounted on a V-hull boat transom 255. FIGS. 23-26 illustrate non-limiting examples of cockpit extensions arranged midship, between engines at the port and starboard sides, mounted on a tri-pontoon boat.

The periphery 52 of a cockpit extension 200 can assume any of a variety of advantageous shapes. FIGS. 2-6 illustrate embodiments where the cockpit extension, when viewed from the top side, has a tapered shape that narrows towards the stern. FIGS. 1, 8A, 8B and 9A illustrate embodiments where the sides of the cockpit extension are approximately parallel, providing a quadrilateral-shaped periphery. FIG. 7 illustrates a cockpit extension with a semi-circular shaped stern, and defined inner bulkheads, outer freeboards, and gunwales extending aft of the outboard engines. Other embodiments can include a cockpit extension with a flared stern that is wider at the aft end, which is not shown, but would be understood by a person of skill in the art. Other shapes can also be employed for the periphery to provide advantages for various purposes. Thus, the invention is not limited to a cockpit extension having only a tapered or quadrilateral-shaped periphery 52.

The aft length 54 of a cockpit extension 200 can vary, often depending on the length of the boat, the size and number of the outboard engines, the position on the transom, the location relative to the boat water line, the shape of the periphery of the cockpit extension, and other factors known to those of skill in the art. In one embodiment, the aft length of a cockpit extension does not exceed the maximum aft distance of an outboard engine 1 in a full down-tilted position. In other embodiments, the aft length of a cockpit extension exceeds the maximum aft distance of an outboard engine in a full down-tilted position, some examples of which are shown in FIGS. 1-9 23-26. More specifically, a cockpit extension can have an aft length of 1', 2', 3', 4', 5', 6', 7', 8', 9', and 10' or an aft length 54 greater than or between any two of the listed values.

In one embodiment, the deck 60 of a cockpit extension 200 is adjacent to the afterdeck, such that the deck is in close proximity to, abuts against, or is continuous with the afterdeck 10 and the deck 60 is accessible from the afterdeck. In a further embodiment, the deck of the cockpit extension is coplanar with the afterdeck 10, such that, when side-by-side, they form a substantially flat area. This can be seen, for example, in FIGS. 1, 3, 4, 7 and 23.

Figure 5A:
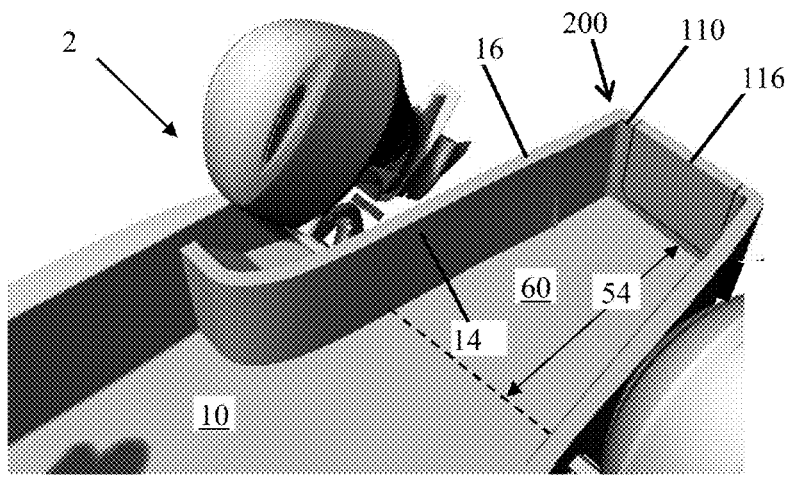
FIG. 5A is an illustration of the stern of a boat with a cockpit extension, according to an embodiment of the subject invention. In this embodiment, an enclosed cockpit extension has an opening for boarding through the cockpit extension. Also shown is an optional aft boarding door to close the opening.
Figure 5B:
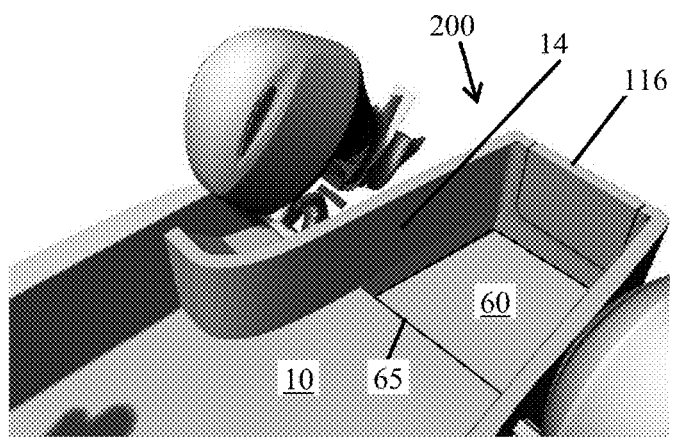
FIG. 5B is an illustration of the stern of a boat with a cockpit extension, according to an embodiment of the subject invention. Shown here the deck of the cockpit extension and the deck of the afterdeck area are not coplanar, such that there is a step that leads to the cockpit extension.

In another embodiment, the deck of the cockpit extension is not coplanar with the afterdeck. In such embodiments, the deck of the cockpit extension can be above or below the afterdeck. For example, there can be one or more steps that lead to the cockpit extension deck from the afterdeck. FIG. 5B illustrates a non-limiting example of an afterdeck 10 with a step down 65 onto the cockpit extension deck 60. Alternatively, there could be a step up from afterdeck onto the cockpit extension deck. In a particular embodiment, the deck of the cockpit extension tilts upward in the aft direction. In a further embodiment, there is minimal obstruction between the afterdeck and the cockpit extension, such that they form a continuous area and the deck of the extension is directly accessible from the afterdeck.

Figure 4:
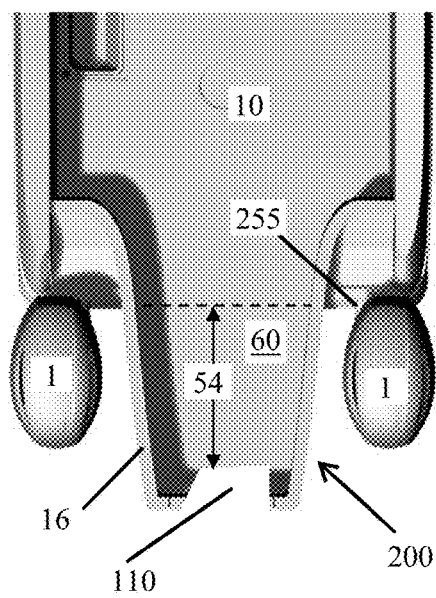
FIG. 4 is a top plan view of a boat with a cockpit extension, according to an embodiment of the subject invention. In this embodiment, the boat hull and gunwales extend partially around the deck extension, providing a stern entryway.
Figure 7B:
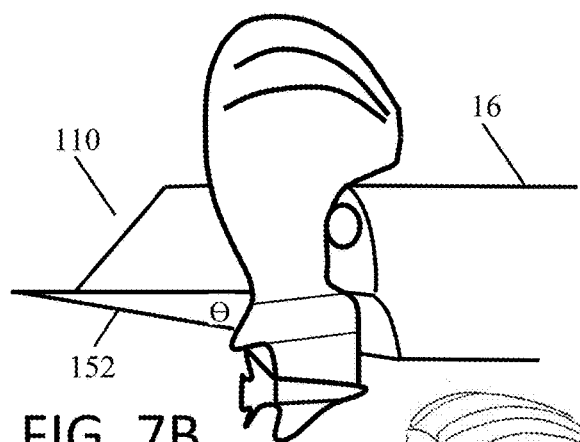
FIG. 7B illustrates a side view of the stern of a boat having a lower surface with a reverse incline surface, where the angle θ formed by the lower surface and true horizontal opens towards the transom.
Figure 7A:
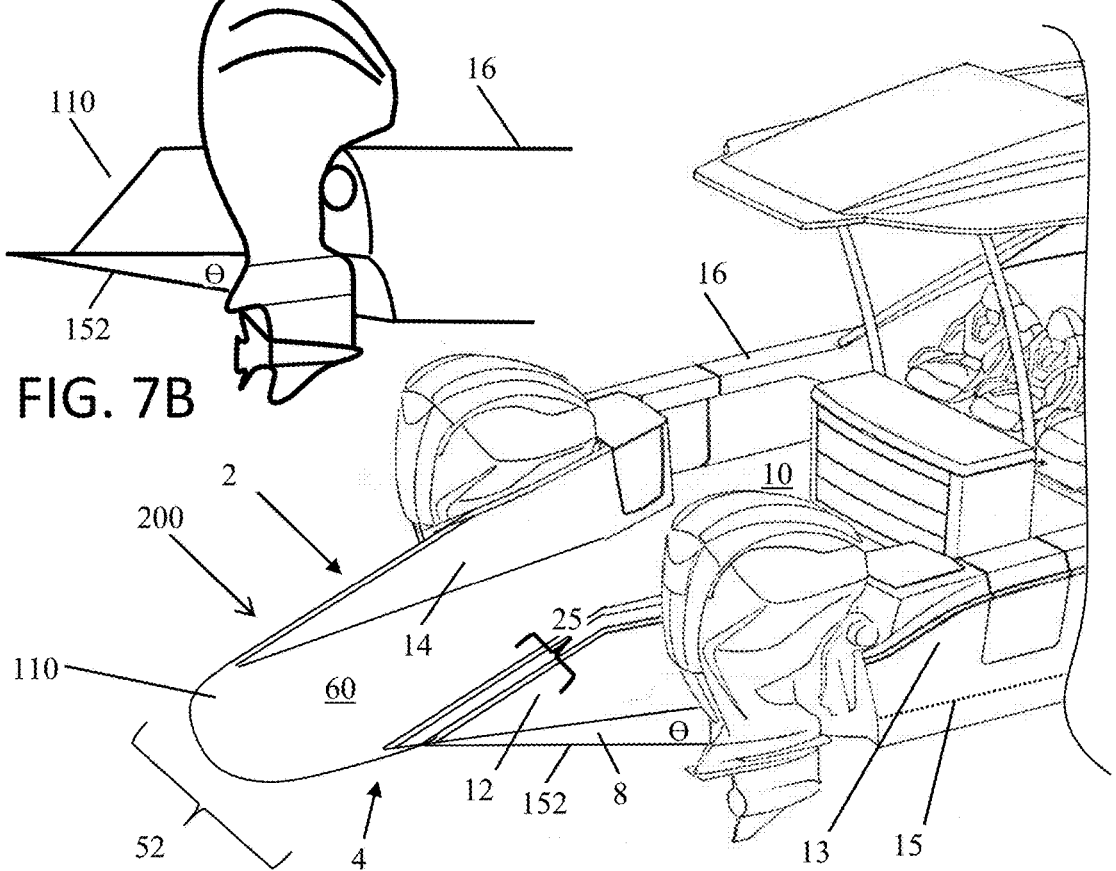
FIG. 7A illustrates the stern of a boat with an alternative embodiment of a deck extension, according to the subject invention, where the boat hull and gunwales extend partially around the deck extension to form an extended cockpit. Effectively, the cockpit sides extend past the transom plane and are illustrated here as partially extending aft of the outboard engines. Also shown is an embodiment of a reverse incline surface on the under-face of the cockpit deck extension.
Figure 10A:
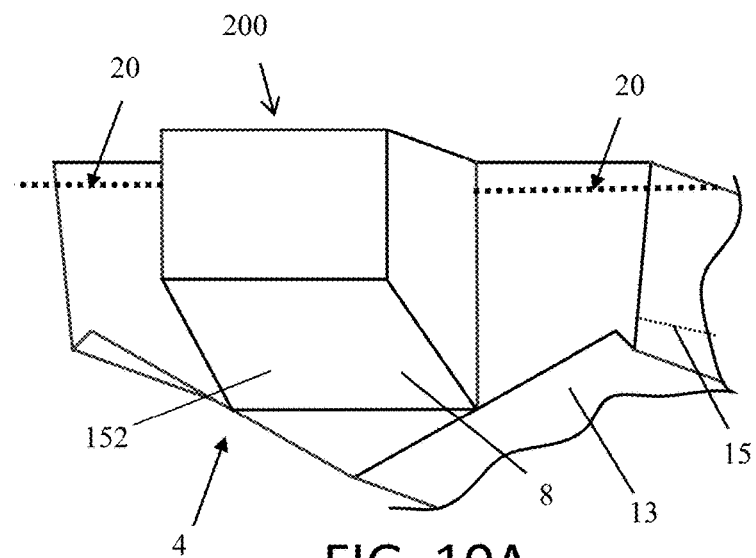
FIG. 10A illustrates the stern of a boat with an embodiment of a cockpit extension with an under-face at the water line of the boat and having a flat inclined lower surface to raise the cockpit extension above the water line during backdown.
Figure 10B:
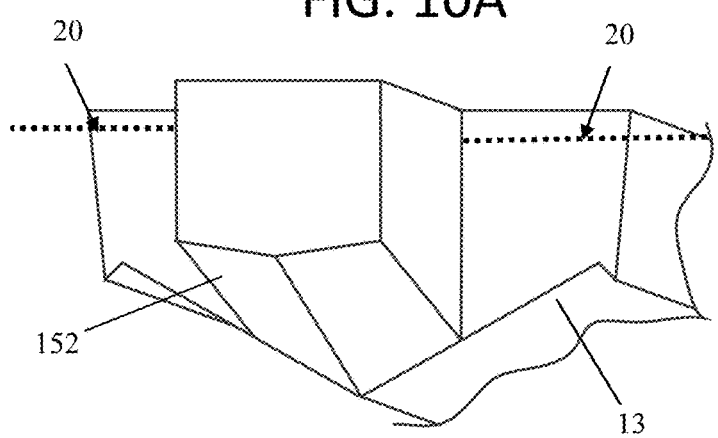
FIG. 10B illustrates the stern of a boat with an embodiment of a cockpit extension with an under-face at the water line of the boat and having a V-shaped inclined surface meeting the hull running surface to raise the cockpit extension above the water line during backdown.
Figure 12:
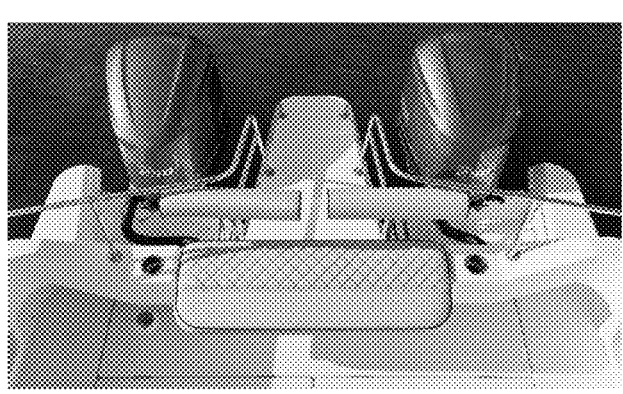
FIGS. 12-16 are photographs of prior art V-hull vessels with aft platforms that are not incorporated with the cockpit of the boat.
Figure 13:
Figure 14:
Figure 15:
Figure 16:
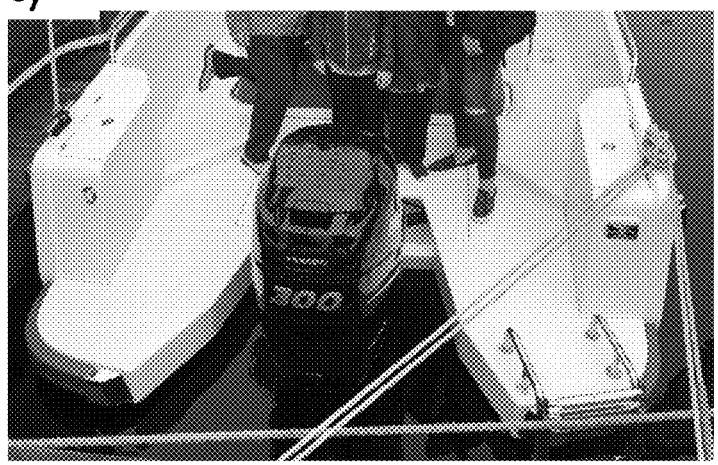
Figure 17:
FIGS. 17-22 are photographs of prior art pontoon boats with platforms between the engines, but which do not extend past the engines. The platforms of these boats are not enclosed as part of the cockpit, but represent a separate area aft of and non-continuous with the cockpit space. The separate, non-continuous areas are also not encompassed by the gunwales on the forward part of the boat.
Figure 18:
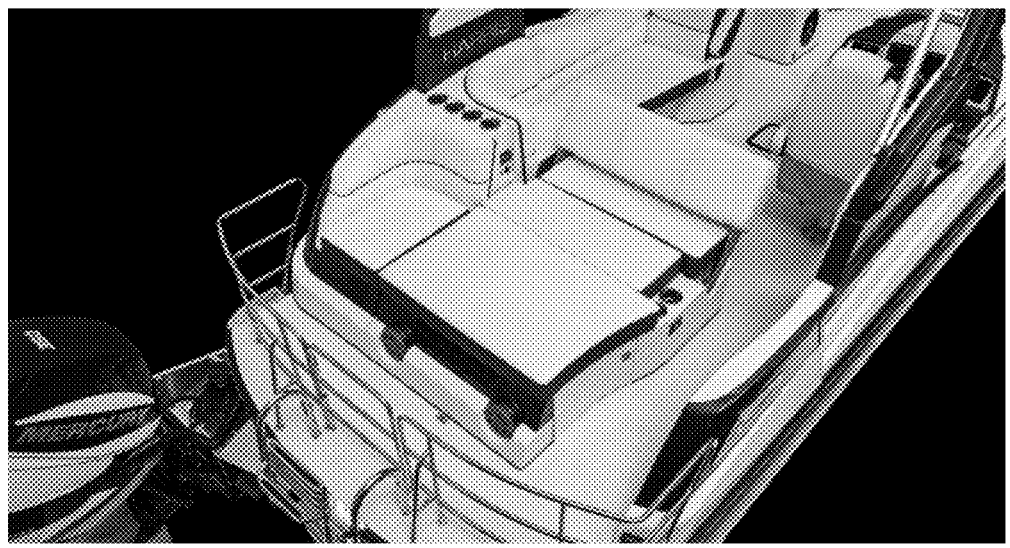
Figure 19:
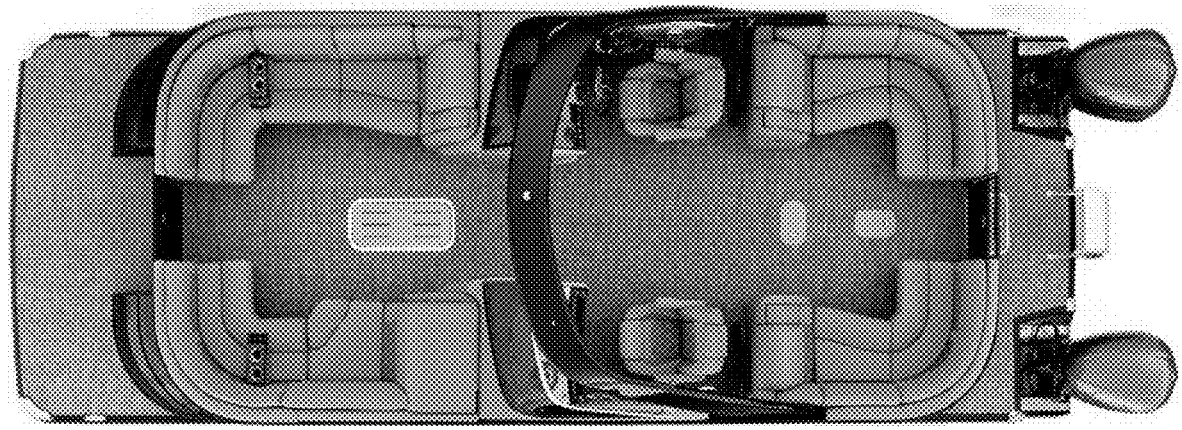
Figure 20:
Figure 21:
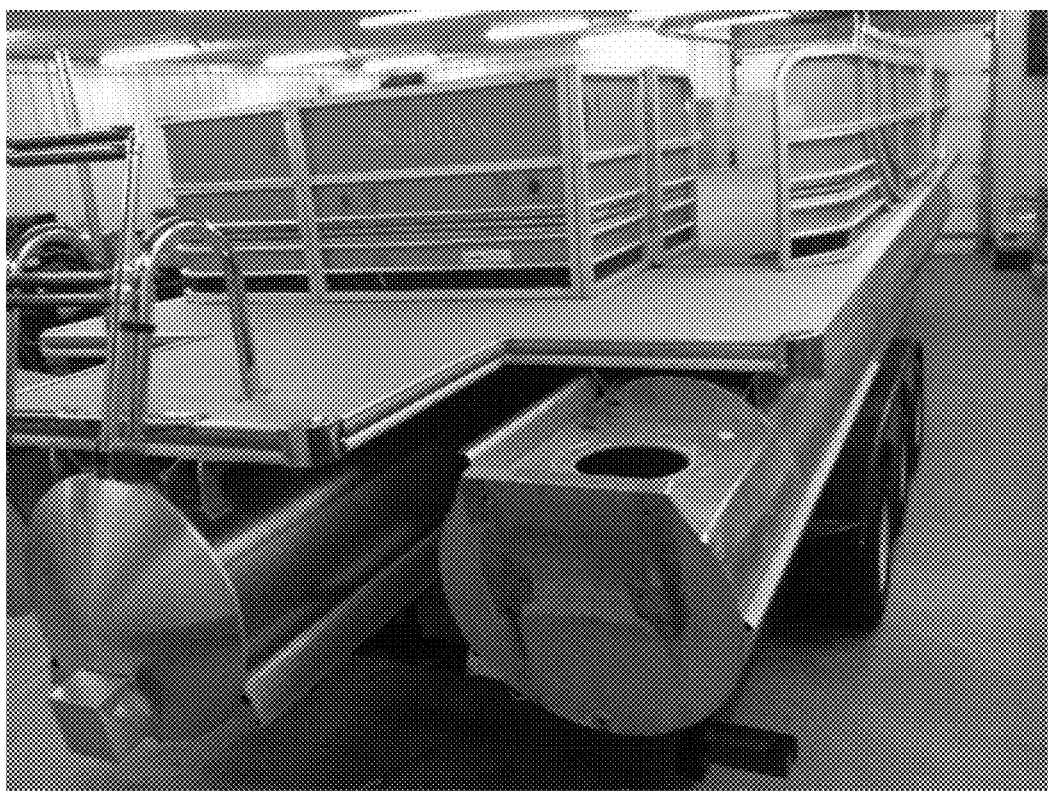
Figure 22:

In an embodiment, the sides 25 of the boat, which can include one or more of an inner bulkhead 14, outer freeboard 12, hull 13, railing system 95, and gunwale 16, do not extend fully around the deck extension. The sides of the boat can extend partially around the cockpit extension, such as shown, for example, in FIGS. 4, 7, and 26. With this embodiment, the boat sides can extend partially around the cockpit extension, such that a portion of the cockpit extension has sides. This can provide an entryway 110 onto the boat by way of the cockpit extension. Optionally, raised rails or railings can accompany or replace the sides of the boat in extending around portions of the periphery of the deck of the cockpit extension. In one embodiment, the sides of the boat that extend to the cockpit extension align with or follow the periphery 52 of the cockpit extension. FIGS. 4 and 7A show examples of boat sides 25 that extend to and align with the periphery of the cockpit extension. Alternatively, the sides of the boat that extend to the cockpit extension can partially align or may not align with or follow the periphery of the cockpit extension. FIGS. 23 and 24 illustrate tri-pontoon boats in which the boat sides partially follow the periphery of the cockpit extension.

In other embodiments, the sides of the boat 25 extend entirely around the periphery 52 of the deck of the cockpit extension, such as shown, for example, in FIGS. 10, 11, 23, and 25. In these embodiments, the extension can have sides, similar to those of the boat, and be fully enclosed. In other embodiments, for example as shown in FIGS. 5A, 8A, and 9A, an entryway 110 can be formed in the cockpit extension sides and a door 116 can be used to close the entryway, thus providing the fully enclosed cockpit extension and an entryway 110. The boat walls and gunwales often have attachments, such as cleats, rod holders, rails, etc. In certain embodiments, the sides of a cockpit extension are amenable to receiving or being replaced by such attachments.

The boat waterline 15 refers to the level on the hull 13 to which the water rises or the level to which the boat sits in the water. The viewable portion of the hull above the waterline can have various markings and coloration. The hull portion below the waterline is usually not visible or only partially visible. On a V-hull boat, the hull portion below the waterline typically has at least a centerline keel and can have one or more types of "strakes" 17, which run along the length of the boat, as shown, for example, in FIG. 9A. On a pontoon boat, the water line can be on the pontoons 275. Thus, for a tri-pontoon boat, there can be three waterlines, one on each pontoon, which can be different depending on how the pontoon boat sits in the water.

A cockpit extension can be utilized on any boat powered with two or more outboard engines. Such boats typically range in size from 15 feet to over 65 feet in length. Where the cockpit extension is located on the transom plane 20, relative to the engines, can depend upon the size of the boat and the number and placement of the engines. Likewise, whether the under-face 70 on the bottom side of the cockpit extension is above, at, or below the water line can depend upon the size of the boat and the size of the boat transom 255.

Figure 6A:
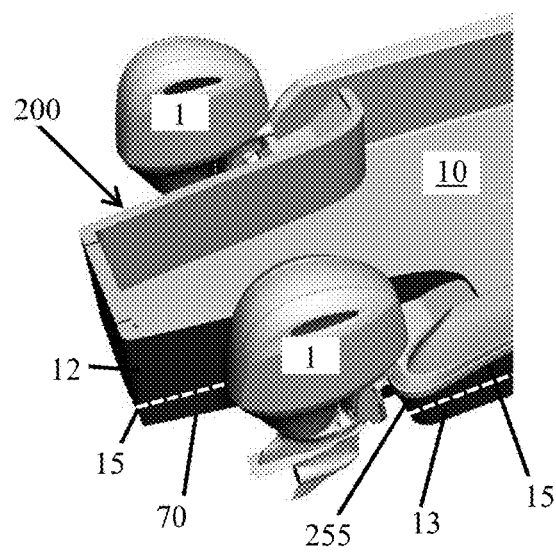
FIG. 6A is an illustration showing the stern of a boat with a cockpit extension, according to embodiments of the subject invention. In this embodiment, the under-face of the cockpit extension is below the water line of the boat, as indicated by the dashed lines.
Figure 6B:
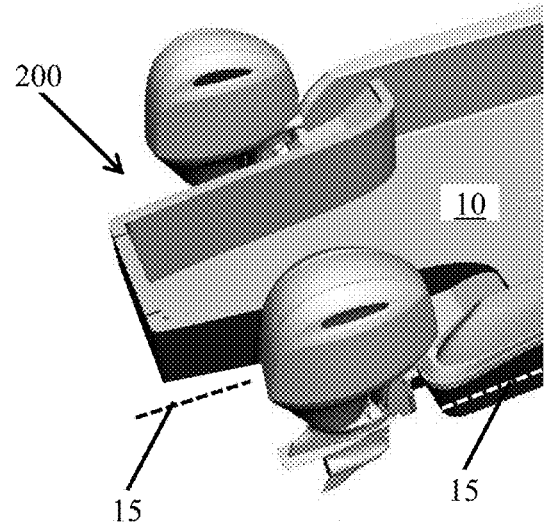
FIG. 6B is an is an illustration showing the stern of a boat with a cockpit extension, according to embodiments of the subject invention. In this embodiment, the under-face of the deck extension is above the water line of the boat, as indicated by the dashed lines.

In an embodiment, a cockpit extension 200 has an under-face 70 that is above the boat waterline 15. In a further embodiment, the cockpit extension is sufficiently above the waterline that when the boat is traveling faster than idle speed, the cockpit extension and under-face are inhibited from extending below the water surface. The under-face is smooth and can also be parallel to the water line. Alternatively, the under-face can have a V-shape or have one or more mild strakes to slake away water that may splash up from the back of the boat. FIGS. 1, 6B, and 10 illustrate examples of cockpit extensions with the under-face sufficiently above the boat water line to inhibit extending into the water while underway. FIGS. 2 and 8A further illustrate an examples of an under-face above the water line with a V-shaped lower surface 8.

An alternative embodiment has a cockpit extension 200 with an under-face 70 that is level with or approximately level with the boat water line 15. Thus, the under-face can contact water when the boat is at rest or in motion. FIG. 9A shows an embodiment with the under-face slightly stepped above the boat hull 13, such that the under-face can be closer to, equal with, or below the water line. Thus, the under-face is not inhibited from extending below the water surface. In an embodiment where the under-face can extend into the water, the under-face is flat. Alternatively, the under-face can have one or more strakes 17 to direct movement of water over the lower surface of the under-face.

In a further alternative embodiment, the boat hull 13 and the under-face 70 of a cockpit extension can be integrated, such that the under-face and hull form a continuous or substantially continuous surface. For example, the boat hull can extend to the bottom side of the cockpit extension. One example of this is shown in FIG. 2. FIG. 24 illustrates an embodiment of a tri-pontoon boat having a cockpit extension that is above the water line, but supported on an extended midship pontoon 276, which forms the under-face of the cockpit extension and can be at about or below the waterline.

When a conventional boat is going in reverse, or "backing down," it pushes water against the transom. Depending on how fast the boat is backing down, the stern can exhibit a "digging in" phenomenon, where the stern is pushed into the water causing water to "pile up" on the boat transom 255. This same phenomenon occurs with tri-pontoon boats, where the water "piles up" on the aft end of the pontoons 275. This can slow the backing down boat and, in some cases, causes water to come over the boat transom onto the deck top side 2, which can be dangerous. A cockpit extension having an under-face 70 that is at least partially level with or approximately level with the boat water line 15 provides a unique advantage. In an embodiment, the under-face 70 can have a lower surface 8 configured to direct water under the cockpit extension and, thus, to the bottom side 4 of the boat during back down. This can inhibit the stern from digging in and improve the backing down procedure.

In an embodiment, the under-face 70 of a cockpit extension 200 or a portion of one or more pontoons 275 has a lower surface 8 on the under-face that is in line with or at least partially below the boat water line 15. In a further embodiment, the lower surface comprises a reversed inclined surface 152, where the angle θ, formed by the lower surface and true horizontal, opens towards the transom plane 20 of the boat. With this configuration, the running surface forms a reverse incline surface 152 where the aft end of the lower surface is higher than the more forward end nearer the transom.

A running surface can be positioned anywhere on the under-face, between the stern of the cockpit extension and the transom plane 20 (FIGS. 9A and 9B). Thus, a running surface can, but does not have to, encompass the entire under-face of the cockpit extension.

Likewise, a running surface on a cockpit extension of a pontoon boat can be positioned on any one or more of the pontoons between the stern of the extension and the transom plane. Examples of various running surfaces 8 are shown in FIGS. 9A, 9B, and 24.

FIGS. 7A, 7B, 10A and 10B illustrate non-limiting examples of lower surfaces that comprise reverse incline surfaces. In another embodiment, there is more than one reverse incline surface 152 on a lower surface, as shown, for example, in FIG. 11, where the lower surface comprises two reverse incline surfaces. A reverse incline surface on a pontoon is not shown in the Figures, but such a configuration would be understood by a person of skill in the art.

As the boat is backing down, the lower surface can deflect water down and under the boat hull or the pontoons. The force of the deflected water on a reverse incline running surface can cause the boat stern to rise and inhibit water from piling up on the transom of the cockpit extension or on the pontoons. The angle θ of the one or more reverse incline surfaces of a lower surface can determine how and where water is deflected. The angle of a running surface can be at least 5°, 10°, 15°, 20°, 25° 30°, 35°, 40°, 45°, 50°, 55°, 60°, 65°, 70°, 75°, or 80°, or an angle in a range between any two of the listed values.

In a particular embodiment, where the under-face 70 of a cockpit extension 200 is integrated with the boat hull, an incline plane of a running surface 8 is arranged towards the stern of the cockpit extension. As described above, the open angle θ of the reverse incline surface 152 is directed towards the transom plane 20. With this embodiment, water approaching the cockpit extension from the aft end can be deflected by the lower surface towards the bottom side 4 of the cockpit extension to wash over the under-face 70 of the cockpit extension and under the boat hull and/or to the sides of the cockpit extension. Examples of this type of running surface are shown in FIGS. 2, 7B, 9B and 10B.

Outboard engine powered boats, both V-hull and pontoon, are popular with boaters. As manufacturing and material technologies improve, the size of the boats increases, which necessitates more outboard engines on a boat to achieve greater speed. The cockpit extension embodiments of the subject invention provide an advantageous improvement to boats with multiple outboard engines by replacing the deck area utilized by the engines. A cockpit extension can provide more space for more activities without negatively affecting the operation of the engines or the boat and with the addition of a running surface can improve certain aspects of the boat design.

All patents, patent applications, provisional applications, and other publications referred to or cited herein are incorporated by reference in their entirety, including all figures, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

Finally, any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The invention claimed is:

1. A tri-toon boat having a transom configured to support at least two outboard engines, comprising:
 an afterdeck forward of the transom;
 port, starboard, and center pontoon hulls;
 a cockpit extension extending aft of the transom, comprising:
  a topside deck with a periphery, a railing system or a gunwale and inner bulkhead extending upward from at least a portion of the periphery of the topside deck, and an under-face beneath the topside deck;

wherein the cockpit extension accesses the afterdeck between the two outboard engines and an aft-most point of the railing system or gunwale extends aft of an aft-most surface of each of the outboard engines.

2. The tri-toon boat according to claim 1, wherein the cockpit extension comprises at least one of a gunwale, outer freeboard, inner bulkhead, or railing system that is respectively integrated with at least one of a gunwale, outer freeboard, inner bulkhead, or railing system of the tri-toon boat.

3. The tri-toon boat according to claim 2, wherein the at least one gunwale, outer freeboard, inner bulkhead, or railing system of the cockpit extension extends entirely around the periphery of the topside deck except for a portion that is adjacent to or integral with the afterdeck.

4. The tri-toon boat according to claim 2, further comprising an entryway in the at least one gunwale, outer freeboard, inner bulkhead, or railing system of the cockpit extension.

5. The tri-toon boat according to claim 4, further comprising a door configured within the entryway.

6. The tri-toon boat according to claim 2, wherein the under-face is above a waterline of the boat.

7. The tri-toon boat according to claim 1, wherein the topside deck is not-co-planar with the afterdeck.

\* \* \* \* \*